No. 715,180. Patented Dec. 2, 1902.
G. TROUVÉ
APPARATUS FOR THE PRODUCTION OF FLAT HELICES, HELICAL SPRINGS, FLEXIBLE HELICAL SHAFTS, OR THE LIKE.
(Application filed Oct. 23, 1901.)
(No Model.) 4 Sheets—Sheet 1.
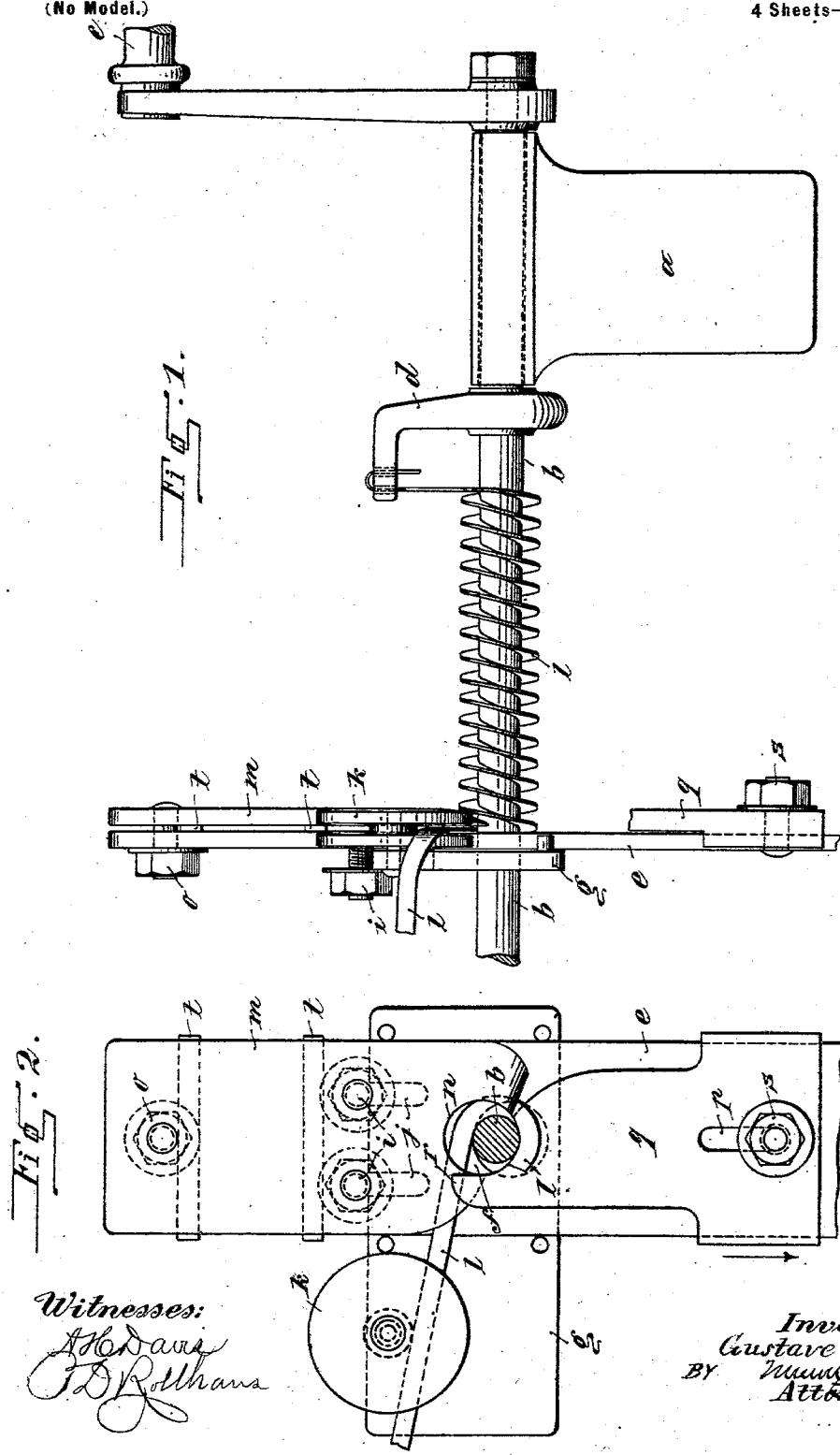
Witnesses:
Inventor
Gustave Trouvé
BY
Attorneys No. 715,180. Patented Dec. 2, 1902.
G. TROUVÉ
APPARATUS FOR THE PRODUCTION OF FLAT HELICES, HELICAL SPRINGS, FLEXIBLE HELICAL SHAFTS, OR THE LIKE.
(Application filed Oct. 23, 1901.)
(No Model.) 4 Sheets—Sheet 2.
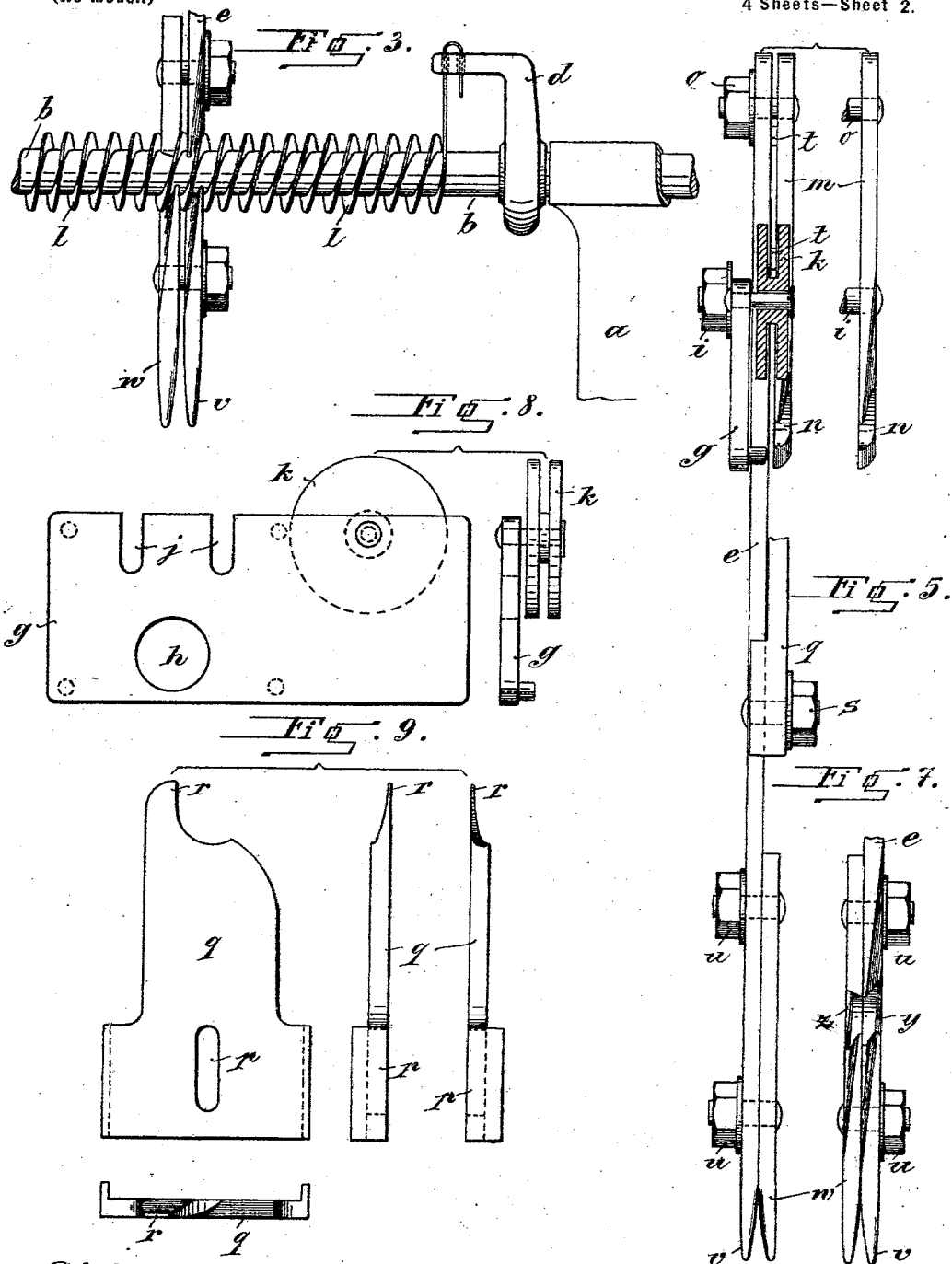

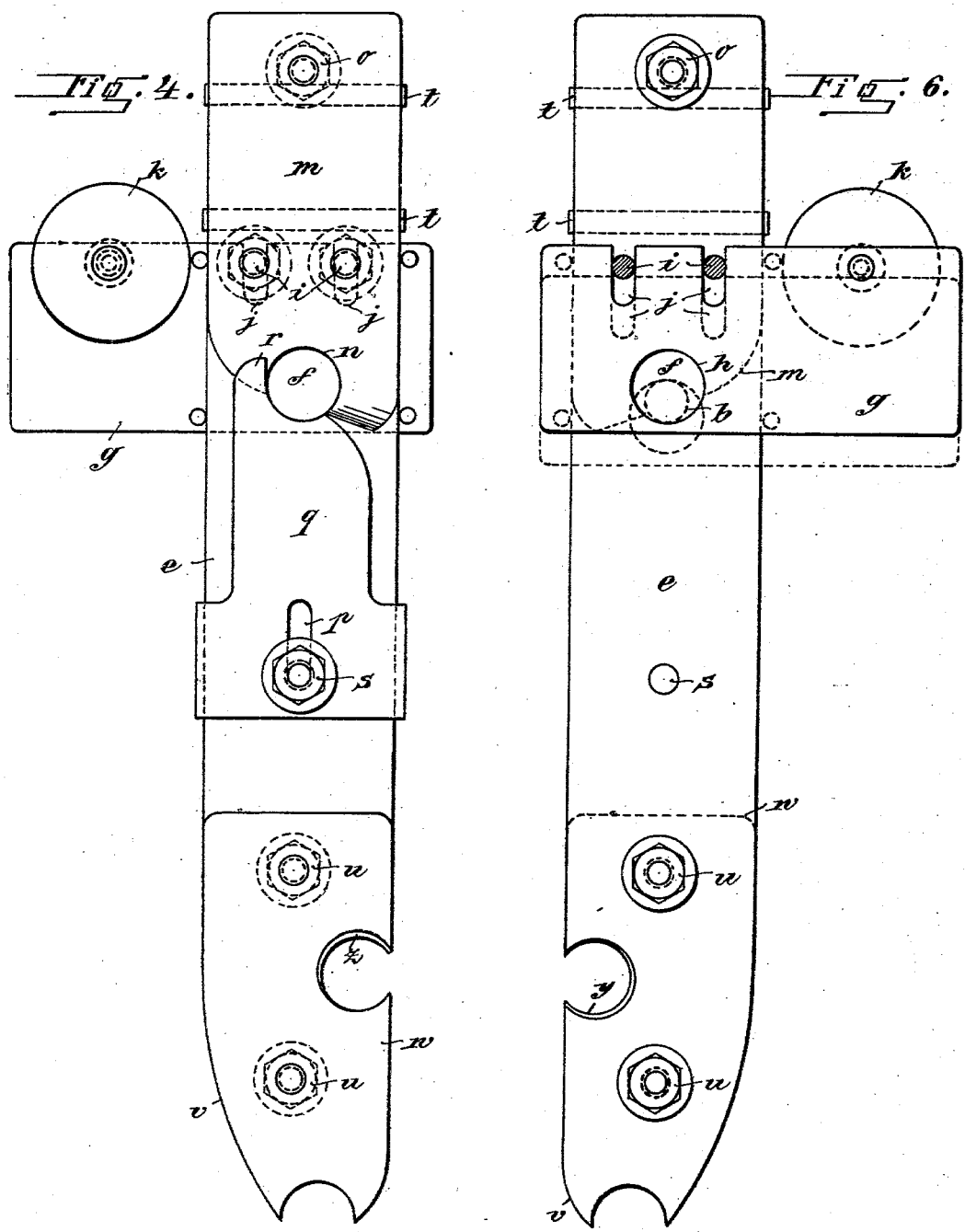

No. 715,180. Patented Dec. 2, 1902.
G. TROUVÉ
APPARATUS FOR THE PRODUCTION OF FLAT HELICES, HELICAL SPRINGS, FLEXIBLE HELICAL SHAFTS, OR THE LIKE.
(Application filed Oct. 23, 1901.)
(No Model.) 4 Sheets—Sheet 4.
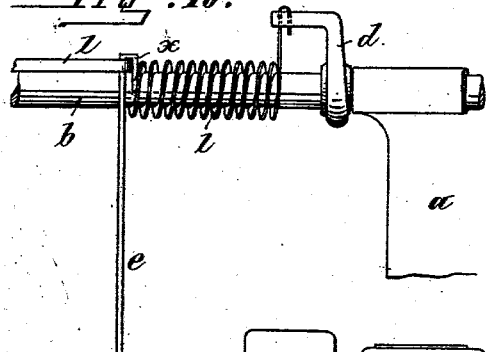
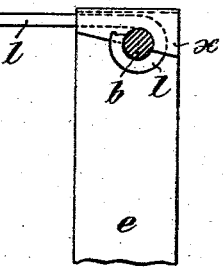
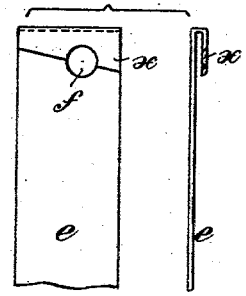
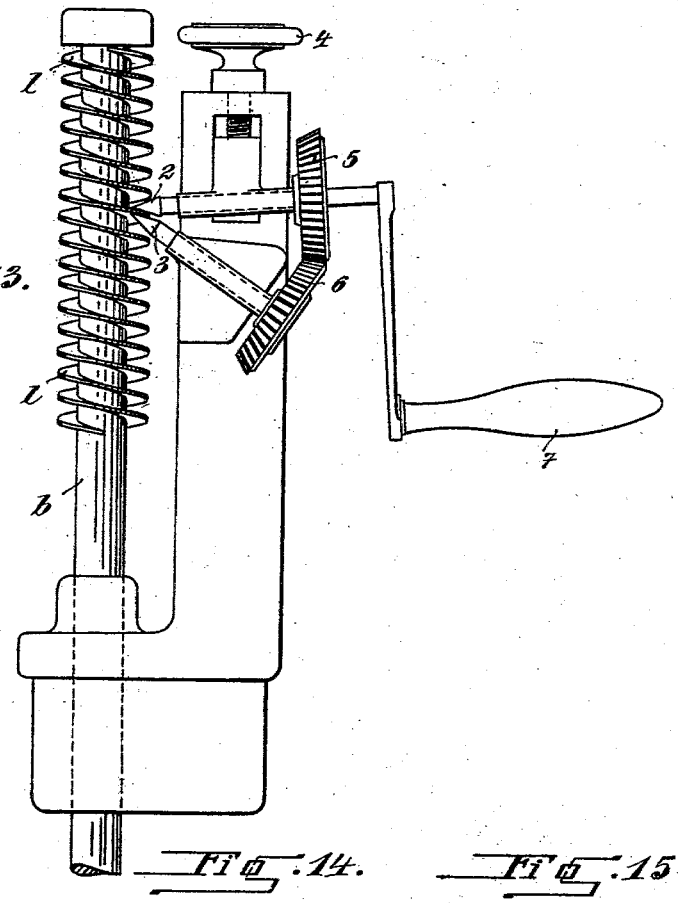
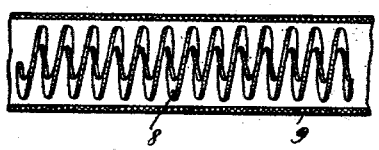
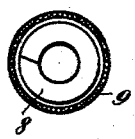
Inventor
Gustave Trouvé

UNITED STATES PATENT OFFICE.

GUSTAVE TROUVÉ, OF PARIS, FRANCE.

APPARATUS FOR THE PRODUCTION OF FLAT HELICES, HELICAL SPRINGS, FLEXIBLE HELICAL SHAFTS, OR THE LIKE.

SPECIFICATION forming part of Letters Patent No. 715,180, dated December 2, 1902.

Application filed October 23, 1901. Serial No. 79,725. (No model.)

*To all whom it may concern:*

Be it known that I, GUSTAVE TROUVÉ, a citizen of the Republic of France, and a resident of the city of Paris, France, have invented certain new and useful Improvements in Apparatus for the Production of Flat Helices, Helical Springs, Flexible Helical Shafts, or the Like, of which the following is a full, clear, and exact specification.

The present invention relates to an improved apparatus by means of which flat helical springs and helical shafts of any kind wound edgewise can be produced from strips of metal in a very simple manner.

In the annexed drawings several forms of the invention are represented.

Figure 1 represents an elevation of one form of the apparatus in its working position. Fig. 2 represents a side view of Fig. 1, seen from the right, with the support of the winding-spindle omitted. Fig. 3 represents an elevation of a device in working position for smoothing and hardening the finished helix. Fig. 4 represents a side view from the right of winding and smoothing apparatus arranged on the same support. Fig. 5 represents a front view of Fig. 4, partially in section. Fig. 6 represents a side view from the left of the apparatus shown in Fig. 4. Fig. 7 is a separate view of the smoothing and hardening device shown in Fig. 3. Figs. 8 and 9 represent details of the support of the winding apparatus. Fig. 10 represents another form of winding apparatus in working position for winding helices of comparatively small dimensions. Fig. 11 is a side view of part of Fig. 10 from the right with the bearings of the spindle omitted. Fig. 12 is a separate view of the guide-support of the apparatus shown in Figs. 10 and 11. Fig. 13 represents another form of the device for smoothing and hardening the finished helix. Figs. 14 and 15 are a longitudinal and a cross section, respectively, of a flexible shaft produced by the method referred to.

As will be seen from the drawings, the apparatus for winding the strip of metal essentially comprises a revoluble spindle $b$, mounted in a block $a$ and provided with a crank $c$ and a suitably-fastened holder or clamp $d$. Placed on the said spindle is a supporting-plate $e$, provided with a hole for the spindle and carrying a device for guiding the strip of metal $l$ to be wound. The construction of the said guiding device depends upon the dimensions of the strip of metal and the helices or helical springs to be produced.

In the form of the winding apparatus represented in Figs. 1 and 2 and 4 to 6 the supporting-plate $e$, in which is a hole $f$ for the spindle $b$, is provided with a slide $g$, which serves to center the strip-guide on the spindle, whatever the diameter of the latter is. For this purpose the slide $g$, which is vertically adjustable by means of set-screws $i$ and longitudinal slots $j$, is provided with a hole $h$, Figs. 6 and 8, against the circumference of which the spindle $b$ impinges when the slide has been properly adjusted. A grooved roller $k$, pivoted on the slide $g$, serves as a guide for the strip of metal $l$, which is also supported by a plate $m$, arranged on the other side of the plate $e$. A cut-away part $n$ of the plate $m$ embraces the spindle $b$, and the said plate can be adjusted at a distance from the plate $e$ equal to the thickness of the strip $l$ by means of adjusting-screws $i$ and $o$. For the purpose of facilitating this adjustment strips of metal or the like $t$ equal in thickness to the strip $l$ may be placed between the plates $e$ and $m$. Below the plate $m$ a plate $q$, Fig. 9, is arranged on the plate $e$ and is adjustable by means of a longitudinal slot $p$ and a set-screw $s$. A tongue $r$ of this plate $q$ serves to hold the first coil of the strip $l$. The operation of this apparatus is as follows: The distance between the plates $e$ and $m$ is adjusted to equal the thickness of the strip of metal to be treated, and the plate $m$ is secured in its position by means of the screws $o$ and $i$. Thereupon the end of the said strip of metal $l$ is passed underneath the roller $k$ and between the plates $e$ and $m$ and laid between the plate $m$ and the tongue $r$ of the slide $q$, being finally fastened to the clamp $d$ on the spindle $b$. A simple revolution of the crank $c$ is then sufficient to produce the first coil of the helix. When this has been done, the slide $q$ is moved back in the direction of the arrow shown in Fig. 2, and the rotation of the crank $c$ is continued. A number of helical coils equal to that of the revolutions of the crank will thus be obtained, the distance between the coils being equal to the thickness of the plate $m$. During the winding of the helix the plate $e$, with the guiding device, is moved laterally (in Fig. 1 toward the left) by the coils as the latter are produced and is held by hand perpendicularly to the axis of the spindle in order not to rotate with the latter.

In the modification of the winding apparatus represented in Figs. 10 to 12 and serving to produce helices of small dimensions the supporting-plate $e$, through the hole $f$, in which the spindle $b$ passes, is provided with a downwardly-bent tongue $x$ at its upper end, the lower edge of the said tongue being cut away at one place to correspond with the diameter of the spindle. The strip of metal $l$ is simply placed between the plate $e$ and the tongue $x$, and the rotation of the spindle will impart to it the shape of a flat helix wound edgewise.

If helical springs are produced from brass or the like in the manner described, it is advisable to smoothen and harden them in order to obtain the desired elasticity. For this purpose the coils of the spring while still on the spindle are passed between two suitably-shaped compressing-cheeks. In the apparatus shown in Figs. 3 to 7 the said press-cheeks $v$ and $w$ are fastened to the lower part of the plate $e$ and are held the requisite distance apart by the screws $u$. When the spindle $b$ is revolved, Fig. 3, the strip of metal is drawn between the cut-away parts $y$ and $z$ of the cheeks $v$ and $w$.

Instead of the device shown in Figs. 3 to 7 that shown in Fig. 13 may be used for the same purpose. The latter device consists of two revoluble cones 2 and 3, which can be brought closely together by means of the screw 4, with which the movable support of the cone 2 is connected. The coils of the helix pass between the said cones 2 and 3 and are tightly pressed by the latter, which are revolved by means of bevel-wheels 5 and 6 and a crank 7.

Helices produced in the manner described may be cut into separate coils, which may be converted into rings by flattening them and soldering their ends together.

The helices wound edgwise in the manner described may further be used as helical springs of any kind, as electrical resistances, flexible shafts, and for many other purposes. Figs. 14 and 15 represent a flexible shaft produced in the manner described. The said shaft consists of a helix 8, wound edgewise and preferably made of steel and provided with a suitable cover 9. By winding edgewise a comparatively thin and therefore very light band of steel an extremely strong and very flexible helix is produced which is particularly adapted to use as a power-transmitting shaft. If exceptionally high resisting capacity is required of the flexible shaft, the latter may be constructed of two or more flat helices produced by the method described and inserted one into the other and, if necessary, provided with a suitable cover.

What I claim, and desire to secure by Letters Patent, is—

1. An apparatus for producing helices comprising a revoluble mandrel, a work-holder, a support fitted loosely on the mandrel and shiftable away from the work-holder, a work-directing element mounted on said support in laterally-spaced relation thereto and shiftable therewith relative to the work-holder, and a work-guide mounted on said support for adjustment therewith and held thereby in operative relation to the work-directing element.

2. An apparatus for producing helices comprising a revoluble mandrel, a stationary work-holder, a supporting-plate fitted loosely on the mandrel and shiftable away from said work-holder, another plate fastened to the supporting-plate in laterally-spaced relation thereto and having a work-directing surface, and a work-guiding roller carried by said supporting-plate and disposed in front of the work-guiding surface, the work-guiding plate and the roller being adjustable with the supporting-plate.

3. In an apparatus for producing helices, the combination with a mandrel and a work-holder, of a vertical supporting-plate shiftable on said mandrel laterally with respect to said work-holder, another plate carried by and adjustable vertically on said supporting-plate, a work-guiding member supported by the second-named plate and adjustable vertically therewith, and a work-directing element spaced laterally from the supporting-plate.

4. In an apparatus for producing helices, the combination of a vertical support, a horizontal plate fastened to said vertical support and adjustable vertically thereon, a guiding-roller carried by said horizontal plate, another plate spaced laterally with relation to said support and having a work-directing surface, means for adjusting the last-mentioned plate on the support, and a revoluble mandrel.

5. In an apparatus of the class described, the combination with a suitable support and a revoluble spindle, of a plate having a work-directing surface, and a slide adjustable into overlapping relation with the plate, as and for the purposes set forth.

6. In an apparatus of the class described, the combination with a revoluble spindle, of a plate having a work-directing element, and a slide provided with a tongue which is arranged to overlap said directing element of the plate, as and for the purposes set forth.

7. In an apparatus of the class described, the combination with a suitable support and a revoluble spindle, of a plate mounted on the support and having a notch adapted to receive the spindle and also having a work-directing surface, and a slide adjustably fastened on the support and provided with a notch and a tongue.

8. An apparatus of the class described, comprising a revoluble spindle, means for directing a work-strip thereto and adapted to produce a helix thereon, and a subsequently effective helix-compressing device adapted to engage with the work on said spindle, as and for the purposes set forth.

9. An apparatus of the class described, comprising a revoluble spindle, means for directing a work-strip to said spindle and adapted to form a helix thereon, and a helix compressing or smoothing mechanism provided with diverging surfaces between which the helix on said spindle is adapted to be received.

10. In an apparatus of the class described, the combination with a supporting-plate having an opening, a revoluble spindle in said opening, a slotted plate fastened adjustably to the supporting-plate and provided with a work-guiding roller, and another plate mounted on the supporting-plate and provided with a recess adapted to partly receive said spindle, as and for the purposes set forth.

In testimony whereof I have signed my name to this specification, this 10th day of October, 1901, in the presence of two subscribing witnesses.

GUSTAVE TROUVÉ.

Witnesses:
I. ALLISON BOWEN,
GEORGE E. LIGHT.